United States Patent

Otsuki et al.

[11] Patent Number: 5,936,864
[45] Date of Patent: Aug. 10, 1999

[54] FREE CURVE INTERPOLATION APPARATUS AND INTERPOLATION METHOD

[75] Inventors: Toshiaki Otsuki, Minamitsuru-gun; Haruhiko Kozai; Yoshiyuki Wakinotani, both of Oshino-mura, all of Japan

[73] Assignee: Fanuc Ltd., Yamanashi, Japan

[21] Appl. No.: 08/793,948

[22] PCT Filed: Jul. 10, 1996

[86] PCT No.: PCT/JP96/01915

§ 371 Date: Mar. 4, 1997

§ 102(e) Date: Mar. 4, 1997

[87] PCT Pub. No.: WO97/03393

PCT Pub. Date: Jan. 30, 1997

[30] Foreign Application Priority Data

Jul. 10, 1995 [JP] Japan .................................. 7-173281

[51] Int. Cl.$^6$ .................................................. G05B 19/18
[52] U.S. Cl. .......................... 364/474.3; 364/474.29; 364/474.31; 318/568.15; 318/568.18
[58] Field of Search .............................. 364/577, 474.29, 364/474.31, 474.32, 474.3, 474.37, 474.36; 318/560–561, 569, 568.15, 568.18

[56] References Cited

U.S. PATENT DOCUMENTS

| 4,648,024 | 3/1987 | Kato et al. . |
| 4,994,978 | 2/1991 | Kawamura et al. . |
| 5,025,362 | 6/1991 | Darlington et al. . |
| 5,065,333 | 11/1991 | Kawamura et al. ................ 364/474.31 |
| 5,197,014 | 3/1993 | Seki et al. .......................... 364/474.31 |
| 5,204,599 | 4/1993 | Höhn . |
| 5,276,383 | 1/1994 | Nishimura et al. ................ 364/474.29 |
| 5,392,217 | 2/1995 | Nashiki et al. .................... 364/474.31 |
| 5,416,394 | 5/1995 | Lee . |
| 5,493,502 | 2/1996 | Niwa . |

FOREIGN PATENT DOCUMENTS

| 2-219107 | 8/1990 | Japan . |
| 2-256483 | 10/1990 | Japan . |
| 7-200035 | 8/1995 | Japan . |

*Primary Examiner*—John Barlow
*Assistant Examiner*—Bryan Bui
*Attorney, Agent, or Firm*—Staas & Halsey

[57] ABSTRACT

A moving path for which an interpolation instruction is given is a free curve expressed by a vector P(k). This curve is divided at predetermined cycles, and tangential vectors P' $(k_1)$ and P' $(k_2)$ at the start point and end point of each divided block are calculated. From these data and an instructed velocity F, an acceleration vector in the corresponding block is calculated. If each axial component of the calculated acceleration vector exceeds an acceleration limiting value set for each axis in advance, the instructed velocity F for the block is lowered to a value at which the axial component does not exceed the acceleration limiting value.

3 Claims, 5 Drawing Sheets

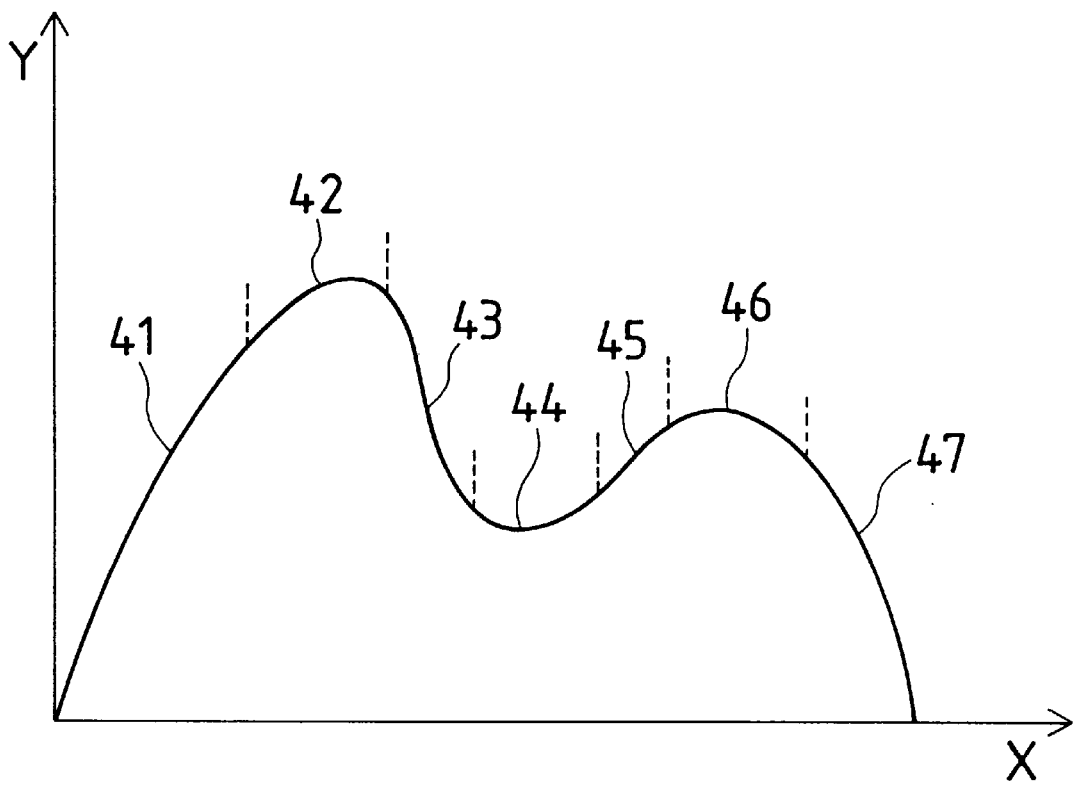

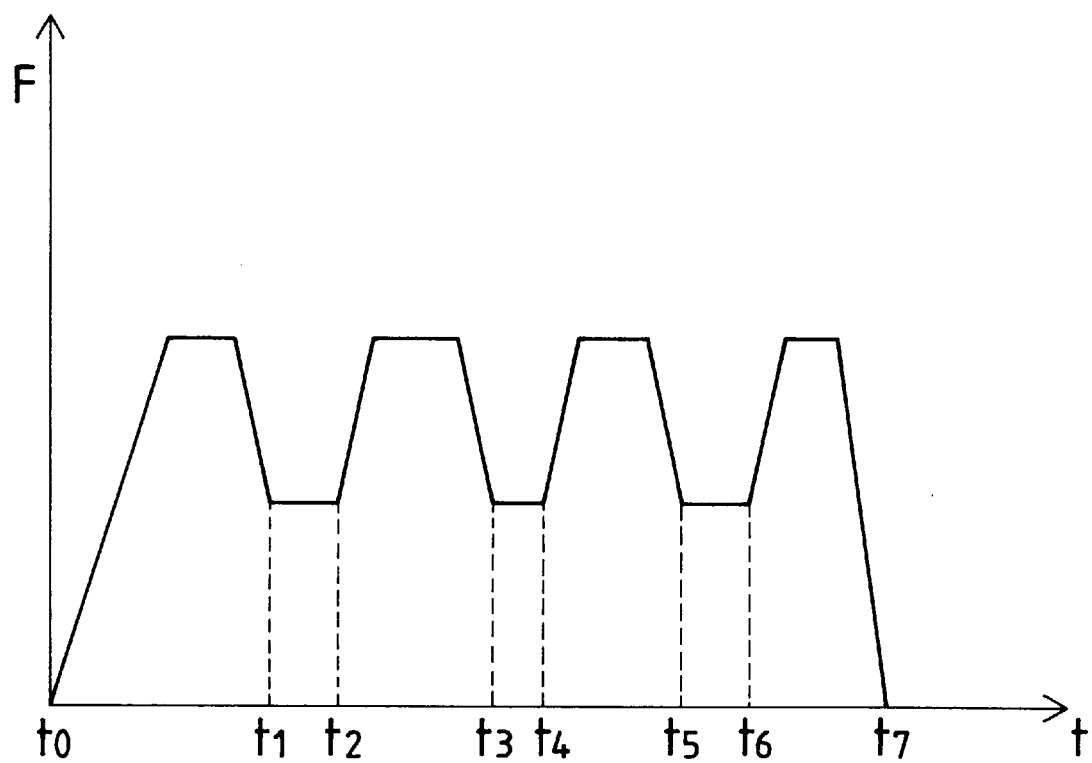

FREE CURVE INTERPOLATION APPARATUS AND INTERPOLATION METHOD

FIELD OF THE INVENTION

The present invention relates to a free curve interpolation apparatus and interpolation method for a numerical control apparatus for controlling movement of the axes of various machines and, more specifically, to a free curve interpolation apparatus and interpolation method for a numerical control apparatus for controlling a velocity in accordance with a machining contour.

BACKGROUND OF THE INVENTION

In a numerical control apparatus, a machining path along which a machine tool performs machining or the like is instructed by a machining program, which is basically composed of instructions by straight lines and circular arcs. However, in case where a machining contour is complicated, instructions composed of only straight lines and circular arcs would make an amount of machining program enormous.

Therefore, in a recent numerical control apparatus, various free curves can be instructed. As typical free curves, spline curves are known. A most popular spline curve among various spline curves is a base spline curve, i.e., a B-spline curve. The B-spline curve can be defined by a plurality of control vectors. In the B-spline curve, a parameter corresponding to a joint between segments is called a knot, and the value of the knot increases from the start point of the entire curve towards the end point thereof. A curve obtained by rationalizing a B-spline curve in which the increase in the number of knot is not uniform, is called an NURBS (Non-Uniform Rational B-Spline) curve.

The coordinate values of an NURBS curve or the like are specified when a variable is determined. Such a free curve is called parametric free curve. When such a free curve is used, a machining program for a complex-shape machining can be formed easily.

When machining a workpiece, a machining velocity has to be changed in accordance with an interpolation path. For example, when linear interpolation is changed into circular-arc interpolation having a small radius, a velocity in the circular-arc interpolation has to be generally suppressed low. This is because the interpolation path of a curve is instructed by a combination of small straight lines, so that, if the velocity is too high, then the distances of respective straight lines increase, and an error between a target curve and an actual interpolation path enlarges.

However, in the case of the interpolation by blocks of a straight line, a circular curve, or the like, a moving velocity can be determined in consideration of a contour at a corner portion such as a joint between blocks or of a change in velocity of individual axis of a machine. However, with respect to a free curve, a moving velocity cannot be determined in consideration of a change in velocity of each axis. More specifically, in the cases of a linear block and a circular-arc block, the change in velocity within the block can easily be calculated, so that it is also easy to determine a moving velocity according to a change in velocity. By contrast, in the case of a free curve, its curvature and the like changes at any time, so that an optimum interpolation velocity for the machining contour changes in accordance with the change in curvature. For this reason, it has been difficult to optimally control the velocity in accordance with these interpolation paths.

DISCLOSURE OF INVENTION

It is an object of the present invention to provide a free curve interpolation apparatus designed so that, even if the shape of a free curve changes, each axis of a machine is moved at a velocity adapting to the changing shape, thereby improving the machining accuracy.

In order to achieve the above object, a free curve interpolation apparatus according to the present invention comprises moving path calculation means for decoding a machining program including a free curve interpolation instruction to calculate a moving path of a free curve, average acceleration calculation means for dividing the moving path into blocks to calculate an average acceleration of each divided block, and velocity control means for controlling a moving velocity of an axis in the corresponding block in accordance with the average acceleration.

A free curve interpolation method according to the present invention comprises a step for decoding a machining program including an interpolation instruction of a free curve having one variable to calculate a moving path of the free curve; a step for dividing the free curve as the calculated moving path for each of the predetermined cycles, differentiating the free curve equations at start point and end point of each divided block by the variable to calculate tangential vectors at the start point and end point of the corresponding block, and calculating actual velocity vectors at the start point and end point of the corresponding block respectively from tile tangential vectors and an instructed velocity for the block; a step for calculating an average acceleration vector for the block from the actual velocity vectors at the start point and end point of the block, the instructed velocity, the difference between the variables at the start point and end point of the block, and a tangential vector at any point representing the block; a step for comparing each axial component of the average acceleration vector with acceleration limiting value of each axis, which is set in advance, to determine whether or not any one of axial components of the average acceleration vector exceeds the corresponding acceleration limiting value; and a step for correcting the instructed velocity for the block to a value at which the axial components of the average acceleration vector do not exceed the acceleration limiting value for every axes, if the axial components exceeds the acceleration limiting value moving, on the other hand, using the instructed velocity in the corresponding block as it is, if the axial component does not exceed the acceleration limiting value.

In the present invention as described above, in the moving instruction of the free curve, the instructed free curve is divided into blocks, and an average acceleration is calculated on the basis of tangential vectors at the start point and end point of each divided block. And, an instructed velocity is calculated back so that the average acceleration does not exceed a limiting value, and the velocity is controlled. Thus, a moving velocity can be set low at a portion where the curvature of the free curve is small. As a result, even if the curve shape changes, each axis can be moved at a velocity adapting to the shape, and machining accuracy can be improved.

BRIEF DESCRIPTION OF DRAWINGS

FIG. 4 is a graph showing an example of an interpolation path; and

FIG. 5 is a graph showing a change in moving velocity.

BEST MODE FOR CARRYING OUT THE INVENTION

Figure 1:
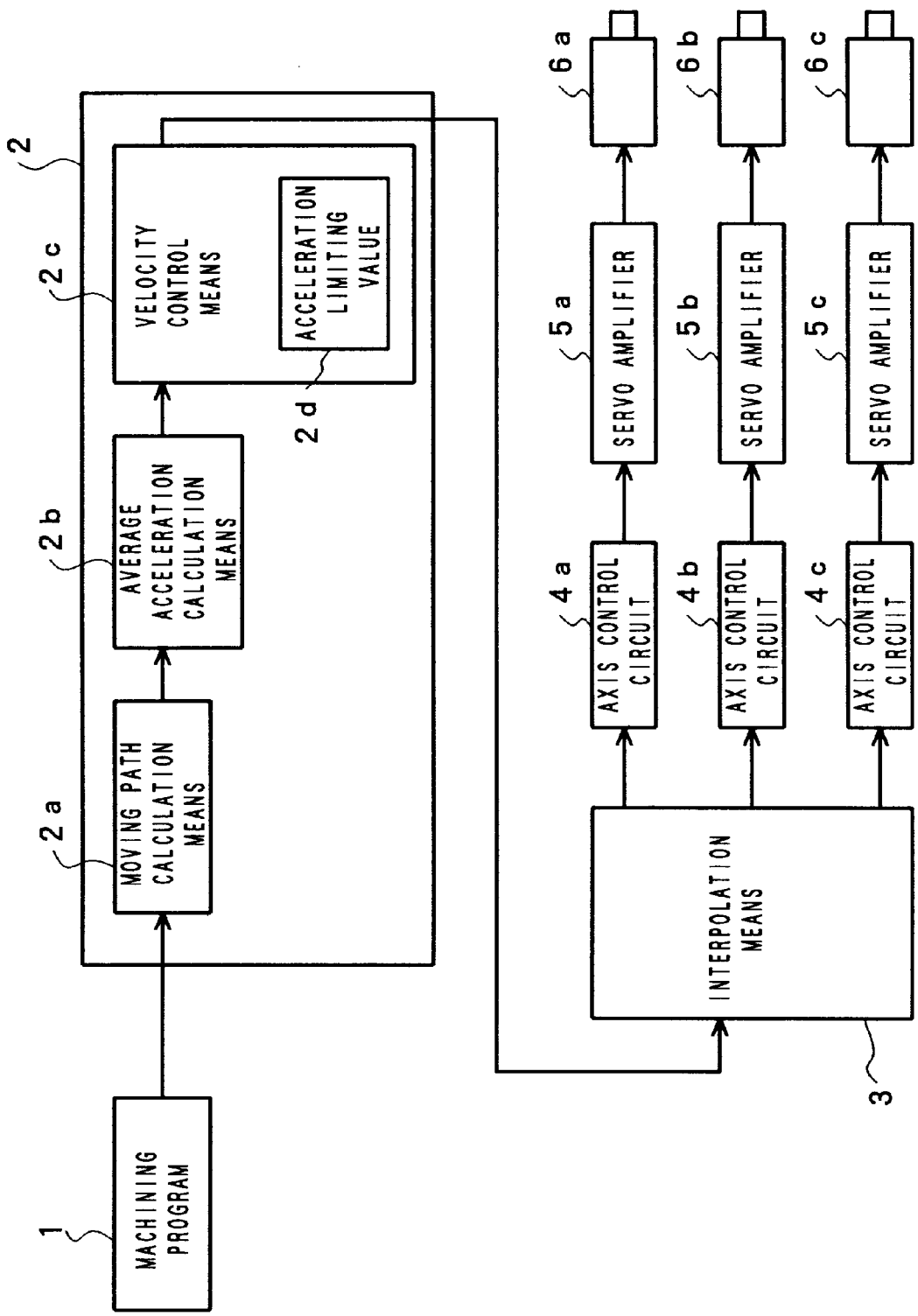
FIG. 1 is a block diagram schematically showing the function of a free curve interpolation apparatus according to the present invention.

The outline of the function of a free curve interpolation apparatus according to the present invention will be described below with reference to the block diagram of FIG. 1. A machining program 1 including an interpolation instruction of a parametric free curve is decoded by a preprocessing operation means 2. In the preprocessing operation means 2, a moving path calculation means 2a calculates the moving path of the free curve on the basis of a free curve interpolation instruction.

An average acceleration calculation means 2b divides the moving path of the free curve at predetermined cycles. Further, a free curve equation having a variable is differentiated by the variable to obtain a tangential vectors at the start point and end point of each divided block. An average acceleration vector in the block is calculated from the difference between a tangential vector at the start point and one at the end point. Further, each axial component (average accelerations for each axis) is calculated from the calculated average acceleration vector.

A velocity control means 2c compares the average acceleration for each axis calculated by the average acceleration calculation means 2b with an acceleration limiting value 2d stored in the velocity control means 2c for each of moving axes. As a result, when the average acceleration for any axis exceeds the acceleration limiting value of the axis, a moving velocity not exceeding the acceleration limiting value is calculated back for the axis, and the calculated velocity is defined as the moving velocity of the block.

An interpolation means 3 outputs interpolation pulses to respective axes in the divided blocks in accordance with the velocity instructed by the velocity control means 2c. The interpolation pulses are inputted to axis control circuits 4a, 4b, and 4c, respectively. The axis control circuits 4a, 4b, and 4c outputs a moving instruction to servo amplifiers 5a, 5b, and 5c. The servo amplifiers 5a, 5b, and 5c control rotation of servo motors 6a, 6b, and 6c in accordance with the moving instruction. With the rotation of the servo motors 6a, 6b, and 6c, the tool moves on the moving path.

In this manner, the average accelerations of each axis for each of blocks, obtained by dividing a free curve, can be set not to exceed the acceleration limiting values set for the axis. Therefore, a moving instruction for a low velocity is outputted for a portion whose radius of curvature of the free curve is small.

The outline of the arrangement of the hardware for a numerical control apparatus constituting a free curve interpolation apparatus according to the present invention will be described below with reference to the block diagram of FIG. 2.

A processor 11 controls the entire numerical control apparatus in accordance with a system program stored in a ROM 12. As the ROM 12, an EEPROM or an EEPROM is used. An SRAM or the like is used as a RAM 13, and calculation data, display data, an input/output signal, and the like are temporarily stored in the RAM 13. A CMOS, backed up by a battery (not shown) to be used as a non-volatile memory 14, stores parameters, a machining program, tool correction data, pitch error correction data, and an acceleration limiting value, which have to be held even after the power source is turned off.

A CRT/MDI unit 20 is arranged on the front surface of the numerical control apparatus or at the same position as that of a machine operation panel and used to display of data and diagrams, input of data, and operation of the numerical control apparatus. A graphic control circuit 21 converts a digital signal such as numerical data or graphic data into a raster signal for displaying and send it to a display unit, 22. The display unit 22 displays these numerical values and diagrams. As the display unit 22, a CRT or a liquid crystal display unit is used.

A keyboard 23 is constituted of numerical keys, symbolic keys, character keys, and function keys and used to make and edit a machining program and operate the numerical control apparatus. A software key 24 is arranged under the display unit 22, and its function is displayed on the display unit. When the content displayed on the display unit changes, the function of the software key changes accordingly.

An axis control circuit 15 receives an axis moving instruction from the processor 11 to output the axis moving instruction to a servo amplifier 16. The servo amplifier 16 amplifies the moving instruction to drive a servo motor coupled with a machine tool 30, thereby controlling relative movement of the machine tool 30 with respect to the workpiece. The axis control circuits 15 and the servo amplifiers 16 are set so that their numbers corresponds to the number of axes of the servo motors.

A PMC (Programmable Machine Controller) 18 receives an M (auxiliary) function signal, an S (spindle velocity control) function signal, a T (tool selection) function signal, and the like from the processor It through a bus 19. These signals are processed by a sequence program to output an output signal, thereby controlling a pneumatic unit, a hydraulic unit, an electromagnetic actuator, and the like in the machine tool 30. The PMC 18 also receives a button signal, a switch signal, a limit switch, and the like from the machine operation panel in the machine tool 30 to perform sequence machining, and transfers a necessary input signal to the processor 11 through the bus 19.

Figure 2:
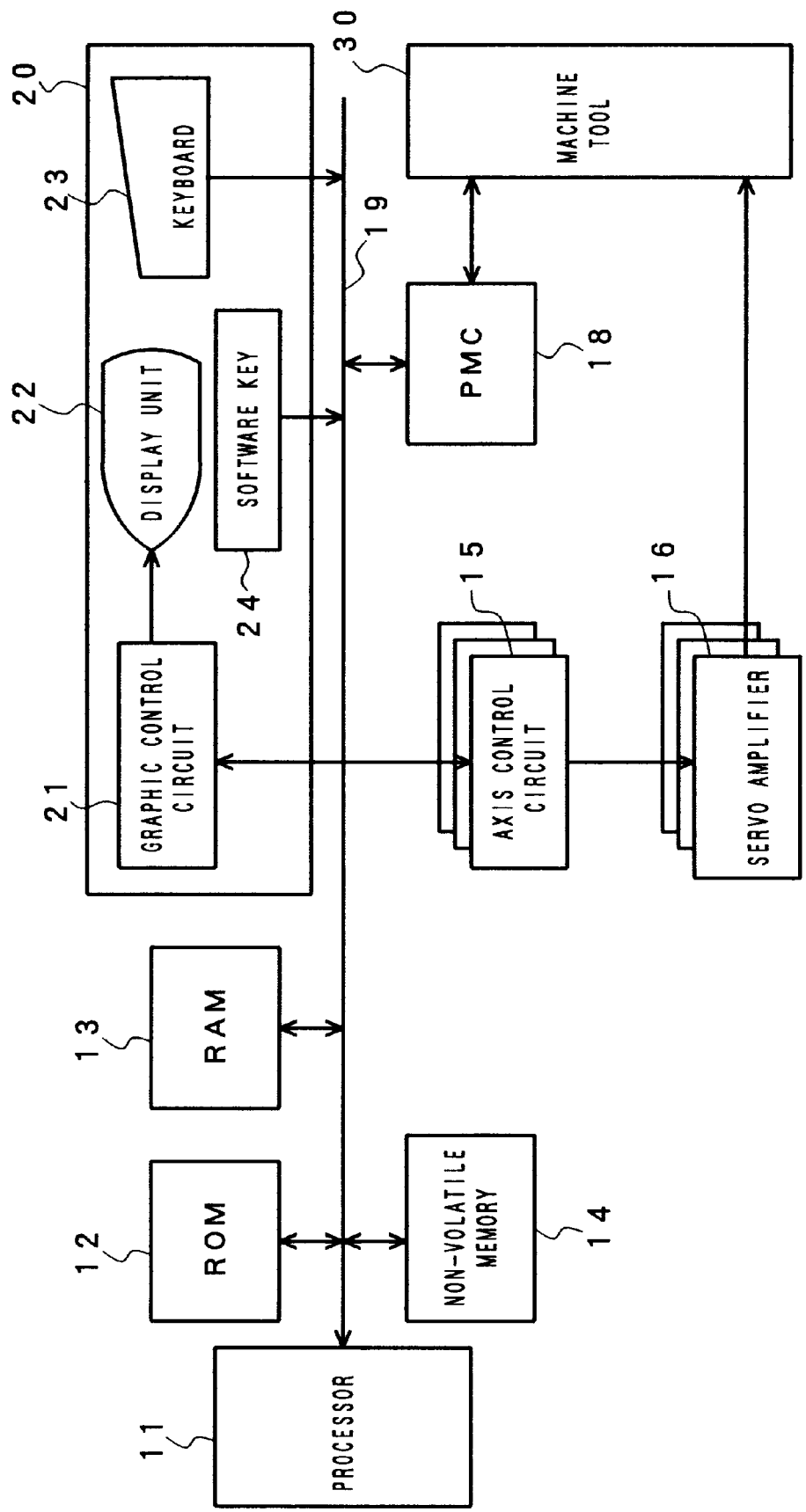
FIG. 2 is a block diagram schematically showing the arrangement of a hardware of a numerical control apparatus constituting the free curve interpolation apparatus of the present invention.

In FIG. 2, illustration of a spindle motor control circuit, an amplifier for the spindle motor, and the like are omitted.

In the above example, one processor 11 is used. However, a plurality of processors may be used to form a multi-processor arrangement.

In the numerical control apparatus having the above hardware arrangement, a method for calculating a moving velocity, when an interpolation instruction for a NURBS curve is outputted, will be described below.

When a free curve equation having a parameter k as a variable is defined as a vector P(k), an NURBS curve is expressed by the equation (1) described below. Assume that, in the following equations, a symbol enclosed by "< >" is a vector.

$$\langle P(k) \rangle = \frac{\sum_{i=0}^{n} N_{i,j} = (k) \cdot w_i \cdot \langle P_i \rangle}{\sum_{i=0}^{n} N_{i,j}(k) \cdot w_i} \quad (1)$$

Where $N_{i,j}$ is a base function, $w_i$ is a weight ($0 \leq i \leq n$), and $<P_i>$ is a vector ($0 \leq i \leq n$) at a control point. Symbol j represents an order (j order=j−1 degree) of the NURBS curve. The base function $N_{j,i}(k)$ of 1 order is expressed by the following equation:

$$Ni \cdot 1(k) = \begin{cases} 1 & (x_i \leq k < x_{i+1}) \\ 0 & (k < x_i, x_{i+1} \leq k) \end{cases} \quad (2)$$

The base function $N_{i,m}(k)$ of m order is expressed by the following equation:

$$N_{i,m}(k) = \frac{(k - x_i)N_{i,m-1}(k)}{x_{i+m-1} - x_i} + \frac{(x_{i+m} - k)N_{i+1,m-1}(k)}{x_{i+m} - x_{i+1}} \quad (3)$$

where $x_i$ is a knot ($x_i \leq x_{i+1}$), and $[x_0, x_1, x_2, \ldots x_m]$ is defined as a knot vector. The relationship "number of control points (n+1)+ number of orders (j)= number of knots (m+1)" holds. Such a free curve interpolation method for the NURBS curve is described in a PCT application (PCT/JP96/01228) filed by the present PCT applicant.

A tangential vector $<P'(k)>$ at k point on a free curve represented by equation (1) is expressed by the following equation.

$$\langle P'(k) \rangle = \frac{d \langle P(k) \rangle}{dk} \quad (4)$$

Control of a moving velocity in a block between parameters $k_1$ to $k_2$ is considered here. Let F be an instructed velocity in the block between the parameters $k_1$ to $k_2$, actual velocity vectors $<f_1>$ and $<f_2>$ at the parameters $k_1$ and $k_2$ are represented by the following equations:

$$\langle f_1 \rangle = \frac{\langle P'(k_1) \rangle}{|\langle P'(k_1) \rangle|} \cdot F \quad (5)$$

$$\langle f_2 \rangle = \frac{\langle P'(k_2) \rangle}{|\langle P'(k_2) \rangle|} \cdot F \quad (6)$$

Figure 3:
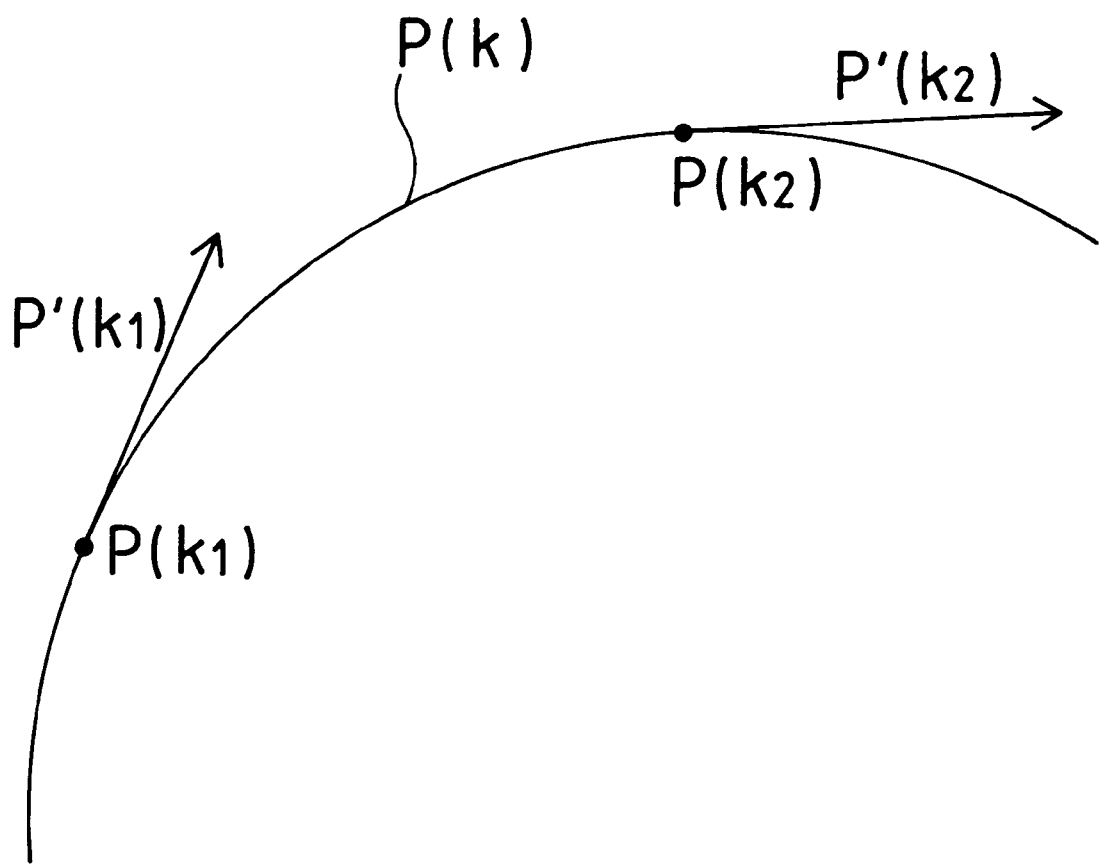
FIG. 3 is a diagram showing the relationship between a free curve equation and tangential vectors.

FIG. 3 is a diagram showing the relationship between a free curve equation and a tangential vector. As shown in FIG. 3, the difference between the directions of tangential vectors $<P'(k_1)>$ and $<P'(k_2)>$ at the parameters $k_1$ and $k_2$ in the block between the parameters $k_1$ and $k_2$ increases as the radius of curvature of the curve in that block decreases.

Assuming that the block between the parameters $k_1$ and $k_2$ is sufficiently small, an average acceleration vector $<\alpha>$ in that block is approximated as expressed below:

$$\langle \alpha \rangle = \frac{(\langle f_2 \rangle - \langle f_1 \rangle)}{\Delta k} \cdot \frac{dk}{dt} \quad (7)$$

where dk/dt obtained by differentiating parameter k by time t is expressed as $$\frac{dk}{dt} = \frac{F}{|\langle P'(k) \rangle|} \quad (8)$$

According to equations (7) and (8), the following equation is obtained:

$$\langle \alpha \rangle = \frac{((\langle f_2 \rangle - \langle f_1 \rangle)F}{(k_2 - k_1) \cdot |\langle P'((k_1 + k_2)/2) \rangle|} \quad (9)$$

In this manner, the average acceleration vector $<a>$ is determined. When an acceleration limiting value is represented by a vector $<A>$, it is determined whether or not x-, y-, and z-axis components $\alpha_x$, $\alpha_y$ and $\alpha_z$ of $<\alpha>$ satisfy the following equations with respect to x-, y- and z-axis components $A_x$, $A_y$ and $A_z$ of $<A>$, $$\alpha_x \leq A_x, \alpha_y \leq A_y, \alpha_z \leq A_z \quad (10)$$

As a result of the determination, when equations (10) are satisfied with respect to all the axes, the axes are moved at the original instructed velocity F. On the other hand, when there is any axis which does not satisfy equation (10), a velocity which may satisfy equation (10) for every axis is calculated back from equation (9). More specifically, a corrected average acceleration vector $<\alpha 0>$ which may satisfy equation (10) for all the axes X, Y and Z is determined first and then a value F0 of F which may satisfy $<\alpha>=<\alpha 0>$ in equation (9) is obtained. Then, the value F0 is defined as an instructed velocity of the block between the parameters $k_1$ to $k_2$.

In this manner, according to the present invention, a change in velocity (i.e., acceleration) of each axis at a predetermined cycle in a block obtained by dividing a free curve at predetermined cycles can be controlled so as not to become larger than a predetermined value.

As is apparent from equation (9), the magnitude of the average acceleration vector $<\alpha>$ depends on a change in moving direction in one block (i.e., a change in an actual velocity vector: ($<f_2>-<f_1>$)). A small radius of curvature of the curve means that a moving direction abruptly changes, and the absolute value of ($<f_2>-<f_1>$) increases. When the absolute value of ($<f_2>-<f_1>$) increases, the absolute value of $<\alpha>$ also increases according to equation (9). By contrast, in order to suppress the left-hand side of equation (9) and the absolute value of $<\alpha>$ low, the value of F in the right-hand side has to be set small. More specifically, when the free curve interpolation method according to the present invention is used, if the free curve includes any portion having a small radius of curvature, interpolation is performed at a velocity F0 lower than the instructed velocity F for such a portion.

FIG. 4 is a graph showing an interpolation path on an X-Y plane. The abscissa denotes an X axis, and the ordinate denotes a Y axis. This moving path is divided into seven blocks 41 to 47. In the three blocks 42, 44, and 46 of the seven blocks, the directions of a tangential vector $<P'(k_1)>$ at the start point of the block and a tangential vector $<P'(k_2)>$ at the end point of the block differ largely. More specifically, when moving is performed at a constant velocity (F), in the blocks 42, 44 and 46, the directions of a velocity vector $<f1>$ at the start point of the block differ and a velocity vector $<f2>$ at the end point of the block differ largely. That is, the average acceleration vector $<f2>$ becomes large. As a result, the condition [$\alpha_x \leq A_x; \alpha_y \leq A_y$] is not satisfied. Consequently, in these three blocks, the instructed velocity F is suppressed to F0 which is lower than the instruction velocity F, and a corrected average acceleration vector $<\alpha 0>$ which satisfies equations (10) can be obtained as a result.

In the blocks 41, 43, 45, and 47, the directions of the tangential vectors at the start point and end point of the block do not differ largely so that, when $<\alpha>$ of the left-hand side is calculated on the basis of the right-hand side of equation (9), the $<\alpha>$ satisfies a condition [$\alpha_x \leq A_x; \alpha_y \leq A_y$]. Hence, the instructed velocity F need not be corrected.

FIG. 5 is a graph showing a change in moving velocity when interpolation is performed using the path shown in FIG. 4. In FIG. 5, the abscissa represents time, and the ordinate represents a moving velocity. The block 41 in FIG. 4 corresponds to a move during the period of time $t_0$ through time $t_1$, similarly, the block 42 to the period of time $t_1$ through time $t_2$, the block 43 to the period of time $t_2$ through time $t_3$, the block 44 to the period of time $t_3$ through time $t_4$, the block 45 to the period of time $t_4$ through time $t_5$, the block 46 to the period of time $t_5$ through time $t_6$, and the block 47 to the period of time $t_6$ through time $t_7$.

Since a radius of curvature in each of the blocks 42, 44, and 46 is small, moving is made at the velocity F0 which is lower than the instructed velocity F in the period from time $t_1$ to time $t_2$, the period from time $t_3$ to time $t_4$, and the period from time $t_5$ to time $t_6$. As a result, in the blocks 42, 44, and 46, the average acceleration does not exceed an acceleration limiting value ($A_x$, $A_y$). In this manner, the velocity is suppressed low when an acceleration is high. As explained above, if an interpolation path is divided into small line segments at predetermined periods of time, difference between the shape of an instructed curve and a path which is actually interpolated becomes small. Therefore, machining accuracy is improved.

As has been described above, according to the present invention, a free curve instructed by a moving instruction for a free curve is divided into blocks, and an average acceleration is calculated from tangential vectors at the start point and end point of each divided block. An instructed velocity is calculated back so that the average acceleration does not exceed a limiting value, and the velocity is controlled. Thus, moving can be made at a low velocity in a portion where the radius of curvature of the free curve is small. As a result, even if the shape of the curve changes, each axis can be moved at a velocity adapted to the shape so that machining accuracy is improved.

What is claimed is:

1. A free curve interpolation apparatus, for a numerical control apparatus, controlling movement of axes of various machines, comprising moving path calculation means for decoding a machining program including a free curve interpolation instruction to calculate a moving path of a free curve;

average acceleration calculation means for dividing the moving path into blocks calculate an average acceleration of each divided block; and velocity control means for controlling a moving velocity of an axis in the corresponding block in accordance with the average acceleration, wherein said velocity control means compares the average acceleration of an axis in a certain block with an acceleration limiting value which is set with respect to each axis in advance, and when it detects that the average acceleration of at least one axis exceeds an acceleration limiting value for the axis, it corrects a moving instructed velocity for the corresponding block to a value at which an average acceleration of all the axes will not exceed the acceleration limiting value of the axis, and when it detects that the average acceleration of any of the axes does not exceed the acceleration limiting value of the axis, it uses the moving instructed velocity in the corresponding block as it is.

2. A free curve interpolation apparatus according to claim 1, wherein said average acceleration calculation means divides a free curve constituting a moving path at predetermined cycles, calculates velocity vectors at start point and end point of each of the divided blocks, calculates an average acceleration vector for the corresponding block from both of said velocity vectors, and calculates an average acceleration of each axis from axial components of the average acceleration vector.

3. A free curve interpolation method, comprising the steps of:

decoding a machining program including an interpolation instruction of a free curve having one variable to calculate a moving path of the free curve;

dividing the free curve as the calculated moving path at predetermined cycles, differentiating the free curve equations at a start point and an end point of each divided block by the variable to calculate tangential vectors at the start point and the end point of the corresponding block, and calculating actual velocity vectors at the start point and the end point of the corresponding block, respectively, from the tangential vectors and an instructed velocity for the block;

calculating an average acceleration vector for the block from the actual velocity vectors at the start point and the end point of the block, the instructed velocity, the difference between the variables at the start point and the end point of the block, and a tangential vector at any point representing the block;

comparing axial components of the average acceleration vector with acceleration limiting values of respective axes which are set in advance to determine whether at least one axial component of the average acceleration vector exceeds the corresponding acceleration limiting value; and correcting the instructed velocity for the block to a value at which the axial components of the average acceleration vector do not exceed the acceleration limiting value for every axes when the axial component exceeds the acceleration limiting value, and using the instructed velocity as it is when the axial component does not exceed the acceleration limiting value.

* * * * *